Sept. 10, 1957 R. J. GALLAGHER 2,806,084

POSTPAY PAYSTATION WITH COIN CONTROL CIRCUIT

Filed Dec. 7, 1953 3 Sheets-Sheet 1

INVENTOR.
RAY JOHN GALLAGHER
BY Wm. Walter Owen
ATTY.

Sept. 10, 1957 R. J. GALLAGHER 2,806,084

POSTPAY PAYSTATION WITH COIN CONTROL CIRCUIT

Filed Dec. 7, 1953 3 Sheets-Sheet 2

INVENTOR.
RAY JOHN GALLAGHER
BY [signature]
ATTY.

Sept. 10, 1957 R. J. GALLAGHER 2,806,084

POSTPAY PAYSTATION WITH COIN CONTROL CIRCUIT

Filed Dec. 7, 1953 3 Sheets-Sheet 3

INVENTOR.
RAY JOHN GALLAGHER

BY Wm. Walter Owen

ATTY.

United States Patent Office 2,806,084

Patented Sept. 10, 1957

2,806,084

POSTPAY PAYSTATION WITH COIN CONTROL CIRCUIT

Ray John Gallagher, River Forest, Ill., assignor to General Telephone Laboratories, Incorporated, a corporation of Delaware Application December 7, 1953, Serial No. 396,538

7 Claims. (Cl. 179—6.5)

The present invention relates in general to telephone paystations and more specifically to telephone paystations of the postpay type having coin controlled circuits particularly adaptable for use therewith.

As applied to postpay telephone paystations, the primary object of my invention is to provide a simple, economical, efficient and improved paystation circuit arranged for use with an improved coin controlled actuating device of a postpay telephone paystation, whereby satisfactory talking connections may be established subsequent to the deposit of a coin, or coins, of a certain specific denomination.

Heretofore, whenever it was desired to establish talking connections between a calling paystation and a called local party, when using a standard type automatic paystation, the deposit of a coin of a certain denomination (such as five cents or one nickel) was the usual required fee before the call could further be extended. However, due to the changed present day economic conditions resulting in rising costs, many telephone companies have been forced to increase the charge on such local calls to ten cents, or one dime or two nickels. Therefore, it has become necessary, whereby a ten cent coin or the equivalent performs the same functions previously accomplished by the five cent coin. Thus, in order to accomplish the above requirements due to the increased fee, it has been found necessary to modify the previous standard automatic paystation and provide a circuit for use therewith, whereby the increased fees are accommodated, while still providing satisfactory and reliable service.

Referring to U. S. Patent 1,383,472, issued July 5, 1921 to G. A. Long, it will be noted that this patent may be taken as one disclosure of the previous standard automatic paystation telephone equipped with standard type components. When this standard paystation, as referred to above, is to be used as a postpay type paystation, the standard coin hopper and coin controlled actuating mechanism such as disclosed in U. S. Patent 1,886,409 issued November 8, 1932, to G. A. Long, is modified. Namely, a different type coin hopper is provided, wherein there is a straight hopper channel leading to the coin box with no coin trap located in the neck of the hopper nor linkage from the coin magnets for controlling the coin trap to either collect or refund the coins, whatever the case may be. It will be noted that in a postpay paystation the coins necessary for completing a connection are deposited only after the called party has answered, or at the request of the operator and that they drop directly into the coin box and can not be refunded.

As disclosed in my invention, the above described postpay coin controlled actuating mechanism has been further modified to include additional coin controlled equipment, whereby the paystation telephone may function as a postpay paystation and also accommodate the aforementioned increase in rates.

In general, a postpay paystation operates briefly as follows: for a local call, the party at the calling station removes his receiver and dials the call number of the party that he desires to establish a connection with. Responsive to answering by the called party, reverse battery is transmitted back to the calling paystation. This reverse battery operates the polarized magnet at the calling paystation, which in turn closes contacts to place a shunt around the transmitter thereat for preventing normal conversation until the required fee has been deposited. A deposited coin or coins, the total value of which must at least equal the required fee, causes these operated polarized magnet contacts to be opened, whereby the shunt is removed from the transmitter and normal conversation is allowed to proceed.

A feature of the invention relates to the novel inclusion of a normally deenergized first control relay and a rotary type microswitch in the paystation circuit and mechanism, and in which the microswitch is operated only by deposited coins of a certain denomination and the control relay is operated to insure that a certain total amount of toll must be deposited before conversation may take place.

Another feature of the invention relates to the provision of an operating circuit for the first control relay which is completed for energizing the relay responsive to the operation of the microswitch, only in case an outgoing call from the paystation is in progress and reverse battery has been applied to the paystation line conductors responsive to the called party answering.

Still another feature of the invention relates to the provision of a normally deenergized second control relay in the paystation mechanism and a circuit for operating said second control relay which is completed responsive to the same deposited coin.

A still further feature of the invention relates to the provision of linkage means in the paystation mechanism which is operated by the second control relay for repositioning the coin trigger contacts which were operated by the first deposited coin, whereby a second coin of the same certain denomination must be deposited before the paystation is conditioned to allow normal conversation.

Referring to a copending application filed November 7, 1951, Serial No. 255,264 to Thomas F. Cassidy, Jr., it will be seen that this application relates to a universal type coin chute particularly adaptable for use with a paystation telephone. This type coin chute comprises three member plates and when they are assembled one over the other, three separate different dimensional coin channels are provided therein for accommodating three deposited coins of different denominations.

Referring also to my copending application filed October 19, 1951, Serial No. 251,211, it will be seen that this application relates to a coin actuated device including a microswitch mounted on and for use with a coin chute such as disclosed in the above-mentioned Cassidy application.

In my instant disclosure it will be noted that a microswitch is also mounted on a coin chute of the type such as disclosed in the above-mentioned Cassidy application, with the actuator arm of the microswitch projecting into the particular coin channel used for accommodating deposited nickels only. It will further be noted that the microswitch is mounted on the coin chute in much the same manner as disclosed in my above-mentioned application. However, no additional equipment on the coin chute is shown since it is not deemed necessary for my disclosure.

The actual mounting position of the coin chute is not shown, however it is assumed to be well-known in the art and as such will only briefly be described as a coin chute having a common coin exit for the three coin channels and mounted with the exit positioned directly over the mouth of the coin hopper, so that acceptable deposited coins are fed directly into the hopper. For a more detailed description of this arrangement, reference may be had with the previously mentioned reference Patent 1,383,472.

Other objects and features of invention will become apparent upon a further perusal of the specification and claims taken in conjunction with the accompanying drawings comprising Figs. 1–6, inclusive, which show by means of the usual diagrams a sufficient amount of apparatus to enable the invention to be described and understood and in which:

Figure 2B:
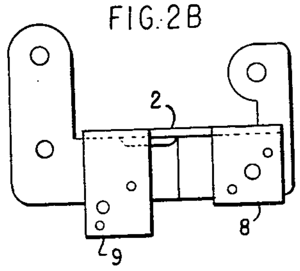
Fig. 2 is a side view of the mounting bracket for the two control relays.
Figure 2:
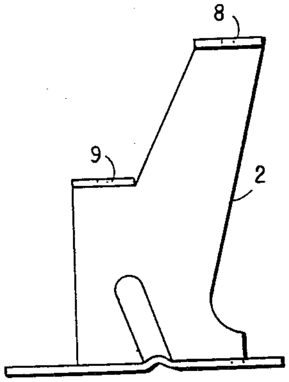
Figure 2A:
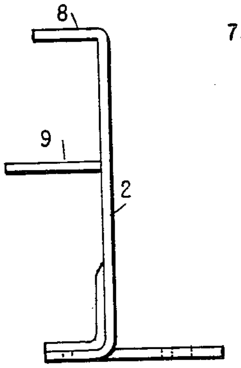

Figs. 2–A and 2–B are end and top views respectively of the mounting bracket.

Figure 3:
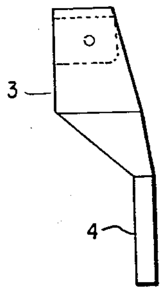
Figure 3A:
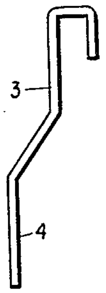

Figs. 3 and 3–A are two different views of the lever restoring element.

Figure 4:
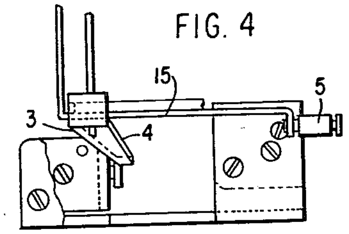

Fig. 4 is a partial view of the top of the mechanism showing more clearly the engagement of the control relay armature with the lever restoring element.

Figure 5:
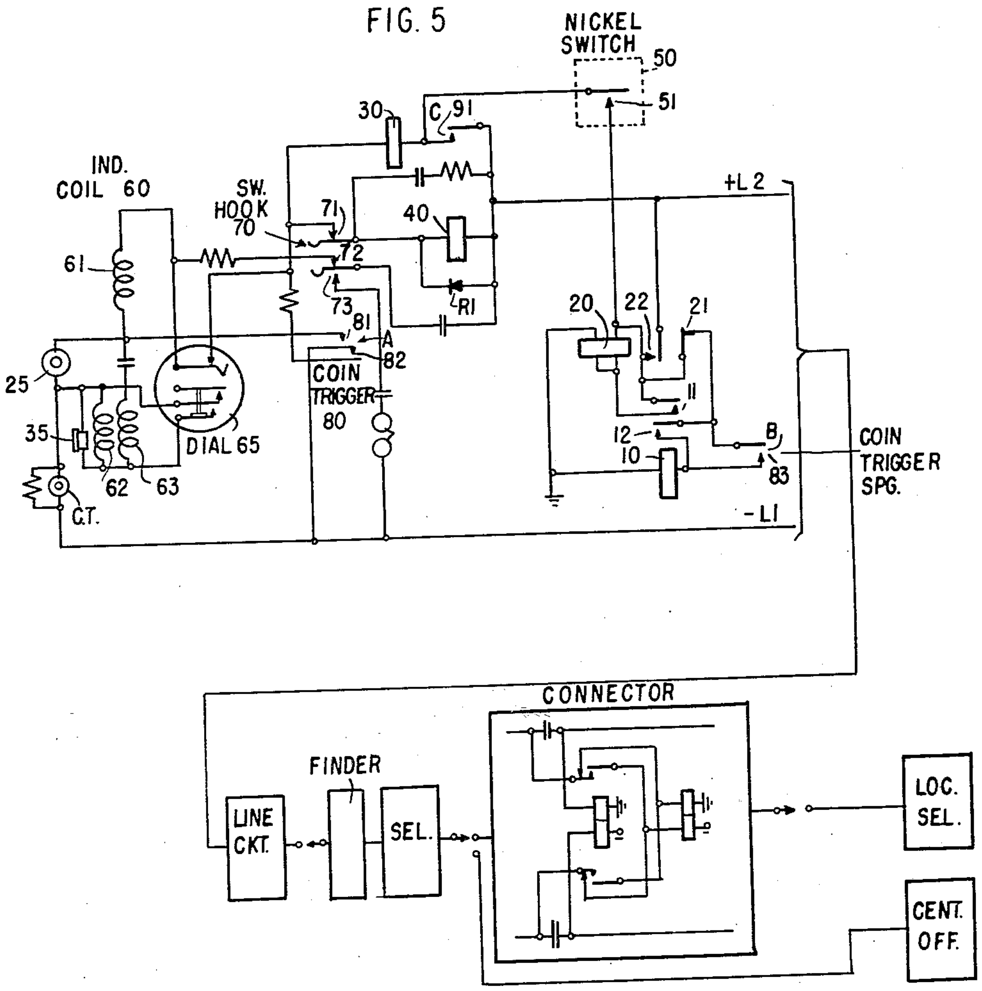

Fig. 5 is a schematic representation of the circuits of a postpay telephone paystation including the invention.

Figure 6:
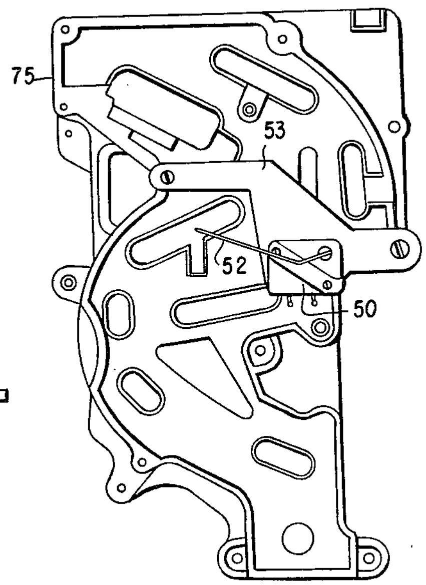

Fig. 6 shows a conventional coin chute with the microswitch mounted thereon and having its actuator arm projecting into the nickel coin channel.

The same reference numbers have been used to indicate the same or similar elements throughout the drawings.

In its preferred form, such as disclosed in the present application, a brief description of the invention will now be given. The paystation similar to the one such as shown in the previously mentioned reference Patent 1,383,472 has been modified so as to be used as a postpay paystation. This postpay paystation is now further modified by including a mounting bracket 2 positioned between the coin hopper and the polarized magnet assembly. This mounting bracket 2 is formed to fit the contour of the base and the lower section of the coin hopper and is secured to the frame beneath the coin hopper mounting flange by using the same mounting screws and holes that are used for mounting the coin hopper. This mounting bracket 2 then extends upward having two mounting ears 8 and 9 provided at different heights thereon. Two control relays 20 and 10 are provided and are secured to these respective mounting ears. Toward the top of the coin hopper mechanism is a coin spring controlling lever 15 having a roller 5 at the extreme end which is operatively engageable by a trip portion (not shown) on the coin trigger assembly. This lever 15 when operated by the trip engages coin trigger contact springs for operation thereof. Directly above control relay 20 and pivotally mounted on the same pivot point used by the controlling lever 15 is a restoring element, or arm 3, which is operatively engageable by the armature of the control relay 20 for raising the control lever 15 so that the coin trigger 80 and the associated contact springs may restore to normal, subsequent to their being operated. A mounting plate 53 having a microswitch 50 secured thereto is mounted on the coin chute 75 as shown herein and previously described, with the microswitch actuator arm 52 projecting into the nickel coin channel.

In operation, when a call is initiated from the paystation, its line is seized and dialling is allowed to take place in a well-known manner. In the case of a postpay paystation system, battery is reversed to the calling line responsive to the called party answering. One of the coin magnets 40 is shunted by a rectifier R1 of any well-known type and thus is normally deenergized. However, when battery is reversed due to answering, this coin magnet 40 becomes energized and thus operates since the rectifier shunt is no longer effective. In operating, coin magnet 40 operates two contact spring groups. One of the operated groups of contact springs including contacts 81 and 82 places a short across the transmitter 25 and a resistive shunt across winding 61 of induction coil 60, whereby the called party may be heard but conversation is prevented from the calling paystation for the time being. The other group of operated contact springs including contacts 91 prepares a future energizing circuit for the other coin magnet 30, but which does not operate in view of the now closed hookswitch contacts 71 and 72. At this time a coin must be deposited to operate the equipment for enabling conversation to take place, with it being assumed that the call is of a local nature and that the minimum required fee is ten cents, or one dime or two nickels.

Assuming at first that a dime is deposited, this deposited coin travels down its respective channel, strikes coin trigger 80 and operates it, whereby the trip on the trigger is moved to operate control lever 15. The operation of the control lever 15 thereby results in restoring the first group of contact springs to normal for permitting conversation to take place. When conversation is over and the receiver is subsequently replaced, hookswitch contacts 71 and 72 are opened and the previously mentioned prepared circuit for the other coin magnet 30 is completed. This magnet operates and restores the coin trigger 80 and all operated contact spring groups to normal. At this point it may be mentioned that a deposited quarter will effect the same operations as a dime, however it should be borne in mind that no coins can be refunded once they are deposited.

Assuming now that two nickels will be deposited to establish proper conversational connections. The deposited first nickel travels down its respective channel, strikes the microswitch actuator 52 and momentarily closes the microswitch contacts 51. The closing of these contacts completes an operating circuit for the control relay 20. This relay operates partially in one step over a circuit to the line conductor that has changed from positive to negative battery potential due to the previously mentioned battery reversal. This control relay 20 completes its own holding circuit which is effective at the time the microswitch contacts 51 restore. The first nickel continues on down the coin chute channel, into the coin hopper 7 and strikes coin trigger 80. The coin trigger 80 is thus operated, which results in restoring the first group of contact springs including contacts 81 and 82 to normal and also operates a third group of contact springs including contacts 83. The operated third group of springs completes an operating circuit for the other control relay 10, which upon operating completes its own holding circuit and moves the restoring element 3. The moving of restoring element 3 operates, or raises, the controlling lever 15 which allows coin trigger 80 to restore, whereby the first group of contact springs are reoperated and the second group of contact springs are restored. The second, or other, control relay 10 also completes a circuit to operate the first control relay 20 completely, or in a second step, and which in turn restores the second control relay to normal upon this full operation. A deposited second nickel now reoperates the microswitch contacts 51 with no effect at this time and continues down the coin channel and hopper to reoperate coin trigger 80. The reoperation of the coin trigger 80 causes the trip to reoperate the control lever 15, which upon operation will restore the first contact spring group to normal and reoperate the second contact spring group. The restoring of the first group now permits conversation as mentioned before in the descritpion covering the deposit of a dime. All subsequent operations are also the same as before described.

A more detailed description of the invention will follow.

Figure 1:
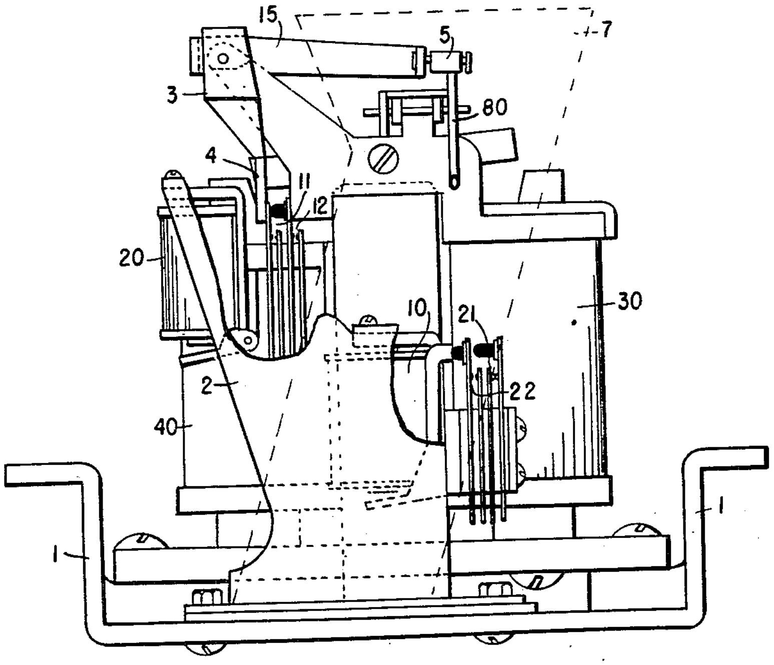
Fig. 1 is a view of the coin controlled actuating mechanism with the coin hopper removed, but represented in its proper place by dotted lines, to more clearly snow applicant's invention.

Referring to the drawings and in particular to Figs. 1 and 5, it will be noted that the schematic disclosure embodying my invention shows the modified postpay paystation circuit of Fig. 5 as having access to local lines, or other lines obtainable through a central office, by means of the usual line equipment common to a postpay telephone paystation system.

At this time, it will be appreciated that it is thought unnecessary to disclose in detail the equipment taken into use during calls from the paystation, since all of the equipment may be assumed to be of the common and well-known type. It will also be appreciated that sufficient equipment is thought to be shown in the connector associated with the local subscriber, for reversing the talking battery in an established connection when the called subscriber answers. The microswitch 50 shown in Fig. 6 is represented in dotted form in Fig. 5 having its respective contact 51 associated therewith. Again it will be mentioned that the coin hopper is represented in Fig. 1 in dotted form.

Assuming for this type of call that a person desires to establish a call from the paystation represented in the left-hand portion of Fig. 5 to a local subscriber represented in block diagram in the right-hand portion of Fig. 5 and that the established fee for a local call is ten cents, or one dime or two nickels. The following operations will take place as described hereafter.

Upon removal of the paystation receiver 25, contacts 71, 72 and 73 of hookswitch 70 take the position as shown, whereby a loop circuit for operating the line relay (not shown) in the line circuit is completed in a well-known manner. Responsive to this operation the finder is started and hunts and connects with the calling paystation, at which time the calling paystation receives dial tone also in a well-known manner. The call number of the desired local subscriber is dialled and the normal well-known signalling connection is made with the local subscriber. Upon receipt of the incoming signal, the local subscriber answers the call and the illustrated equipment of the associated connector is operated to reverse the talking battery supplied to the connection.

It will be appreciated that prior to reverse battery being applied to the line conductors of the calling paystation line and during the time that line conductor L2 is of a positive battery potential, the winding of coin magnet 40 is obviously shunted by the rectifier R1. However, when battery is reversed, the line conductor L2 then has a negative battery potential applied to it and the winding of coin magnet 40 is no longer shunted by the now non-conductive rectifier R1. Coin magnet 40 is thus operatively energized and in so doing closes contacts 91. Contacts 81 and 82 associated with coin trigger 80 are also closed by the operated coin magnet 40.

The closing of contacts 81 and 82 place an obvious shunt across winding 61 of the induction coil 60 and a short across the transmitter 25. At this stage of operation the calling party at the paystation can hear the called party but is prevented from using his transmitter 25 to talk to the called party and is further prevented from using receiver 35 as a transmitter. The closing of contact 91 prepares a point in a future energizing circuit of release magnet 30.

In order for normal conversation to take place, the calling party must now deposit the proper fee for operating the paystation coin controlled mechanism so that conversation may be held.

Assuming in the first case that a dime only is deposited. The dime travels down its respective channel in coin chute 75 and enters the coin hopper 7 and strikes coin trigger 80. Coin trigger 80 is rotated downward and allows roller 5 of the coin spring controlling lever 15 to follow the contour of the trigger and thereby allow lever 15 to move downward. Lever 15 engages contacts 81 and 82 in a well-known manner and they are opened. Lever 15 also engages contacts 83 and they are closed. The opening of contacts 81 and 82 removes the previously mentioned shunt and short, whereby normal conversation is now allowed to take place. The closing of contacts 83 performs no useful function at this time.

It will be appreciated that a deposited quarter instead of a dime will cause the same operations, such as just described, if a dime is not available.

Assuming now in the next case that two nickels are to be deposited as payment of the required local fee. The equipment is operated as hereafter described, with it being remembered that the paystation is in the same condition as described just prior to the deposit of the dime. As the first nickel is deposited it travels down its respective channel in coin chute 75. At approximately mid-point in this travel, the nickel strikes actuator arm 52 of microswitch 50 and rotates the arm downward. This rotation of arm 52 momentarily closes microswitch contact 51 which completes an energizing circuit for control relay 20. This circuit may be traced from positive ground through both windings of relay 20, microswitch contacts 51, contacts 91 and to line conductor L2 which now has negative battery potential applied to it. Control relay 20 operates in a first step operation and closes its "X" contact 22 only, which provides a direct holding circuit for itself to line conductor L2. By now the first nickel has passed actuator arm 52 and this arm restores to normal, thereby opening microswitch contact 51. The first nickel continues on its way and enters the coin hopper and strikes coin trigger 80. The resultant action again operates coin trigger 80 and lever 15 in the same manner as previously described for a deposited dime, with contacts 81, 82 and 83 being respectively opened and closed as mentioned before. However, at this time the closing of contacts 83 completes an energizing circuit for control relay 10. This circuit may be traced from positive ground, winding of relay 10, contacts 83 and contacts 22 to negative battery on line conductor L2. In operating, control relay 10 completes its own obvious holding circuit by way of contacts 12. The operating armature of control relay 10 engages lower finger 4 of the lever restoring element 3 and rotates element 3 in a counterclockwise direction. The top part of element 3 engages lever 15, whereby lever 15 is lifted, or rotated, upward and coin trigger 80 is allowed to restore to normal. In this manner, contacts 81 and 82 are again closed and contacts 83 are opened so that normal conversation is prevented for the present, for the reason that only one nickel has been deposited.

Control relay 10 also closes contacts 11 which place an obvious short across the right-hand winding of control relay 20. Relay 20 thus operates fully in a second step and opens contacts 21, which in turn opens the holding circuit of control relay 10 and this relay promptly restores with no subsequent effect on the mechanism at this time.

A second nickel is now deposited and microswitch contacts 51 are closed as previously described, with no useful function at this time. The second deposited nickel subsequently enters the coin hopper and operates coin trigger 80 to cause lever 15 to open contacts 81 and 82 and to close contacts 83 as previously described. The opening of contacts 81 and 82 now permits normal conversation to take place as described before, while the closing of contacts 83 performs no useful function at this time.

The restoring operation of the paystation is the same each time regardless of the denomination and quantity of coins deposited. Therefore, at the end of conversation and when receiver 35 is placed on hookswitch 70, contacts 71 and 72 are opened and contacts 73 are closed. Coin magnet 30 is thereby serially included in an obvious connection with the operated equipment of the line circuit and line finder as soon as conductor L2 becomes positive due to contacts 91 being previously closed. Coin magnet 30 is thereby energized and operates. At this time it will be noted that coin magnets 30 and 40 both control a common tippable armature in a manner which is well-known in the paystation art. As coin magnet 30 operates this common tippable armature, a linkage (not shown) from the armature restores contacts 91, 81, 82 and 83 to normal. Magnet 30 thereupon releases when contacts 91 open and the associated line circuit and line finder are allowed to restore. The paystation is now conditioned to handle subsequent future calls.

If a toll call by way of the central office is initiated, the answering by the central office does not cause the battery reversing equipment of the connector to operate, hence coin magnet 40 can not operate and contacts 91 remain open. Contacts 81 and 82 also remain open. If a dime or quarter is deposited, there is no operation of the coin controlled mechanism since contacts 81 and 82 are already open and the closing of contacts 83 performs no function at this time. If two nickels are deposited, the first nickel can not cause the operation of control relay 20 since contacts 91 are open, nor will the deposit of a second nickel result in the operation of control relay 10 since its energizing circuit is also open. Deposited nickels also cause no resultant operation of the coin trigger contacts for the same reason as described for the deposited dimes or quarters.

Having described my invention and what is considered new and desired to have protected by Letters Patent will be pointed out in the appended claims.

What is claimed is:

1. In a telephone system, a line having a paystation thereon, a called subscriber line, means for extending a connection from said paystation line to said called subscriber line, a normally incomplete disabling circuit, means including a first group of contacts at said paystation and operated when said extended connection is answered by said called subscriber for completing said disabling circuit to prevent normal conversation from taking place over said connection, first control means, means for partially operating said first control means responsive to the deposit of a coin of a particular denomination, holding means including certain contacts operated by said partial operation of said first control means for maintaining said first control means partially operated, means including a coin trigger operated by said deposited particular coin for restoring said first group of contacts to normal, second control means, means including said certain contacts and also a second group of contacts operated by said operated coin trigger for operating said second control means, means operated by said operated second control means for reoperating said first group of contacts, said coin trigger reoperated by a subsequently deposited coin for again restoring said first group of contacts to normal to thereby open said disabling circuit and permit conversation to take place over said connection between said paystation and said called subscriber.

2. A telephone system such as claimed in claim 1, having means including contact means operated by said operation of said second control means for causing said first control means to operate from said partial operation to a full operation, and means operated by said full operation of said first control means for causing said second control means to restore to normal.

3. A telephone system such as claimed in claim 1, including release means, means including hookswitch contacts operated at said calling paystation when said conversation is completed for operating said release means, and means controlled by said operation of said release means for restoring said second group of contacts and causing the subsequent restoration of said first control means to normal.

4. In a telephone system, a line having a postpay paystation thereon, a called subscriber line, means for extending a connection from said paystation line to said called subscriber line, an electromagnet, means for operating said electromagnet only responsive to the answering of said extended connection by said called subscriber, a normally incomplete disabling circuit, means including a first contact group operated by said operation of said electromagnet for completing said disabling circuit to prevent conversation from taking place between said paystation and said called subscriber over said connection, a first control relay, means for partially operating said first control relay responsive to the deposit of a certain coin of a particular denomination, holding means including special contacts operated by said partial operation of said first control relay for maintaining said first control relay partially operated, means including a coin trigger operated responsive to said deposited certain coin for restoring said first contact group to normal, a second control relay, means including said special contacts and also a second contact group operated by said operated coin trigger for operating said second control relay, means operated by said operated second control relay for reoperating said first contact group, said coin trigger being reoperated by a subsequently deposited coin for again restoring said first group of contacts to normal to permit conversation to thereby open said disabling circuit and take place over said connection between said calling paystation and said called subscriber, release means, means including a third contact group controlled by said electromagnet for preparing for the operation of said release means, hookswitch contacts included in said last-mentioned means and operated by said calling paystation when said conversation is completed, for operating said release means, and means controlled by said release means for restoring said second and third contact groups to normal.

5. In a postpay telephone system, a calling paystation line, means for establishing an outgoing connection with a desired subscriber by said paystation, a coin chute included in said paystation and having a plurality of different denominational coin channels provided therein, a coin hopper also in said paystation and positioned directly below the coin exit of said chute, a control magnet included in said connection, shunting means connected in parallel with said magnet and rendered conductive by normal battery potential for shunting said magnet to prevent the operation of said control magnet during the time that said normal battery potential is applied to said paystation line, means operated responsive to said desired subscriber answering said connection for applying reverse battery potential to said paystation line, said shunting means thereafter rendered non-conductive to said reverse battery, whereby said shunt is ineffective and said control magnet is operatively energized, a normally incomplete disabling circuit, means including a first group of contacts operated by said control magnet for completing said disabling circuit to prevent normal conversation from taking place between said calling paystation and said desired subscriber over said connection, a first control relay having two windings, an energizing circuit for operating said first control relay in a partial operation over said two windings, a circuit closer mounted on said coin chute and operated by a deposited coin of a certain denomination, contacts closed by said operation of said circuit closer for completing said first control relay energizing circuit, a holding circuit including certain contacts closed by said partial operation of said first control relay for maintaining said relay partially operated, a coin trigger projecting into said hopper and operated by said deposited certain coin, linkage means engaged by said operated coin trigger for temporarily restoring said first group of contacts to normal, a second control relay, an energizing circuit for operating said second second control relay and including said closed certain contacts of said first control relay holding circuit, a second group of contacts closed by said operated coin trigger for completing said second control relay energizing circuit, restoring means operatively engageable with said linkage means and controlled by said operated second control relay for reoperating said first group of contacts, said coin trigger thereafter reoperated by an acceptable deposited coin for reoperating said linkage means to again restore said first contact group to normal, whereby said disabling circuit is ineffective and conversation between said paystation and said desired subscriber is permitted to take place.

6. A postpay telephone paystation system such as claimed in claim 5, including a release magnet, an energizing circuit for operating said release magnet, a third group of contacts controlled by said operated control magnet for preparing a point in said release magnet energizing circuit, hookswitch contacts included in said release magnet energizing circuit and operated by said paystation caller when said conversation is finished for completing said release magnet energizing circuit, and means controlled by the operation of said release magnet for restoring said second and third groups of contacts to normal.

7. A postpay telephone system such as claimed in claim 5, including a circuit for shunting one of said first control relay windings, contacts operated by said operation of said second control relay for completing said circuit to shunt the said one winding of said first control relay, said first control relay thereafter operating in a complete operation, and other normally closed contacts included in said second control relay energizing circuit opened by said first control relay in its said complete operation for causing said second control relay to restore to normal.

References Cited in the file of this patent

UNITED STATES PATENTS

| | | |
|---|---|---|
| 2,133,523 | Alexandersson et al. | Oct. 18, 1938 |
| 2,214,245 | Evers | Sept. 10, 1940 |
| 2,281,062 | Brubaker | Apr. 28, 1942 |
| 2,520,644 | Lomax | Aug. 29, 1950 |
| 2,674,655 | Gallagher | Apr. 6, 1954 |